US012585795B2

(12) United States Patent
Peterson et al.

(10) Patent No.: US 12,585,795 B2
(45) Date of Patent: Mar. 24, 2026

(54) PROTECTION OF DATA BASED ON STANDARDS OF SECURITY PROTECTION

(71) Applicant: International Business Machines Corporation, Armonk, NY (US)

(72) Inventors: Beth Ann Peterson, Tucson, AZ (US); Matthew G. Borlick, Tucson, AZ (US); Lokesh Mohan Gupta, Tucson, AZ (US); Rashmi Chandra, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 18/643,908

(22) Filed: Apr. 23, 2024

(65) Prior Publication Data

US 2025/0328658 A1     Oct. 23, 2025

(51) Int. Cl.
*G06F 21/60* (2013.01)

(52) U.S. Cl.
CPC .................................. *G06F 21/602* (2013.01)

(58) Field of Classification Search
CPC ........................... G06F 21/602; G06F 21/6218
See application file for complete search history.

(56) References Cited

U.S. PATENT DOCUMENTS 9,374,390 B1    6/2016 Teal et al.
10,043,035 B2    8/2018 LaFever et al.
11,030,341 B2    6/2021 LaFever et al.
11,790,117 B2    10/2023 LaFever et al.
11,886,232 B2    1/2024 Mahaffey et al.
2014/0283107 A1*  9/2014 Walton .................... G06F 21/62
                                         726/27
2015/0310188 A1*  10/2015 Ford ...................... H04L 63/101
                                         726/28

OTHER PUBLICATIONS

Thales, "Integrated Data Discovery and Classification with Enhanced Protection," Thales, 2021, 2 pages.
World Economic Forum, "The 'Zero Trust' Model in Cybersecurity: Towards understanding and deployment," World Economic Forum, Community Paper, Aug. 2022, 19 pages.

(Continued)

*Primary Examiner* — Sangseok Park
(74) *Attorney, Agent, or Firm* — Zilka-Kotab, P.C.

(57) ABSTRACT

A computer-implemented method (CIM), according to one embodiment, includes determining a first standard of security protection of a first vector, and applying the first standard of security protection to a first volume of data. In response to a determination that a second standard of security protection of a second vector is relatively less strict than the first standard of security protection, an action by the second vector is prevented from being performed on the first volume of data for at least a duration that the first standard of security protection is applied to the first volume of data. In response to a determination that a third standard of security protection of a third vector is relatively more strict than the first standard of security protection, an action by the third vector is allowed to be performed on the first volume of data.

20 Claims, 4 Drawing Sheets

(56) References Cited

OTHER PUBLICATIONS

Wiley Online Library, "Special Issue on Trusted and Dependable Intelligent Systems," International Journal of Intelligent Systems, 2020, 1 page, retrieved from https://onlinelibrary.wiley.com/pb-assets/assets/1098111x/INT.SpecialIssue.Application_on_Trust_AI.4.2020-1586378928210.pdf.

Zhu et al., "A Secure and Efficient Data Integrity Verification Scheme for Cloud-IoT based on Short Signature," IEEE Access, Jun. 2019, pp. 1-10.

Anonymous, "Intelligent Selection of Authorization Access Level Based on the Context and Stress Analysis," IP.com Prior Art Database, Technical Disclosure No. IPCOM000266770D, Aug. 18, 2021, 5 pages.

Anonymous, "Method of Intelligent Multiple Factor Authentication Management," IP.com Prior Art Database, Technical Disclosure No. IPCOM000264012D, Oct. 31, 2020, 4 pages.

Anonymous, "Automatic execution of authentication actions at high trust levels," IP.com Prior Art Database, Technical Disclosure No. IPCOM000252059D, Dec. 14, 2017, 8 pages.

* cited by examiner

100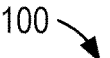

COMPUTER  101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

STANDARD OF SECURITY PROTECTION DETERMINATION CODE

150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 1

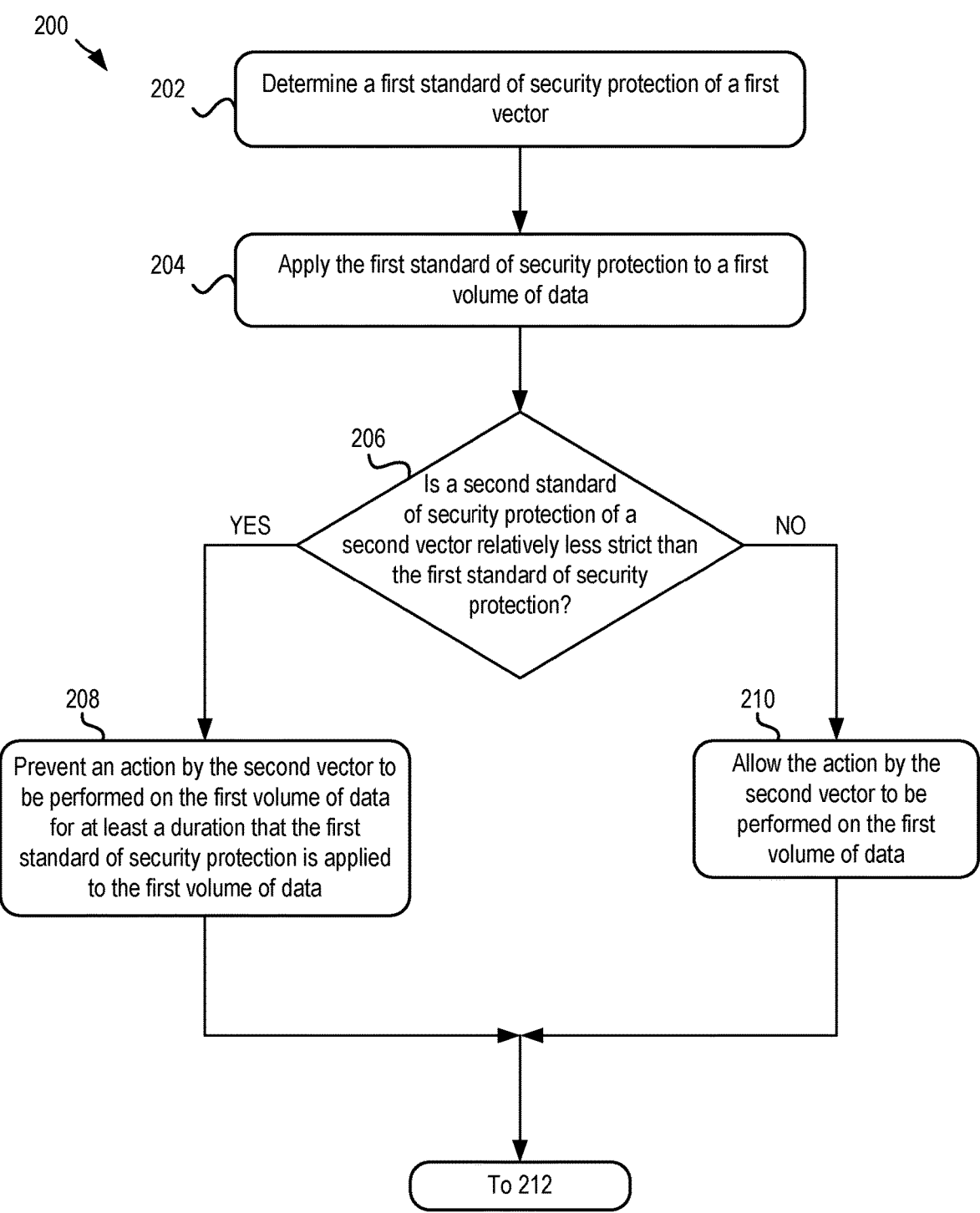

200

202    Determine a first standard of security protection of a first vector

204    Apply the first standard of security protection to a first volume of data 206    Is a second standard of security protection of a second vector relatively less strict than the first standard of security protection?

YES    NO

208    Prevent an action by the second vector to be performed on the first volume of data for at least a duration that the first standard of security protection is applied to the first volume of data 210    Allow the action by the second vector to be performed on the first volume of data To 212

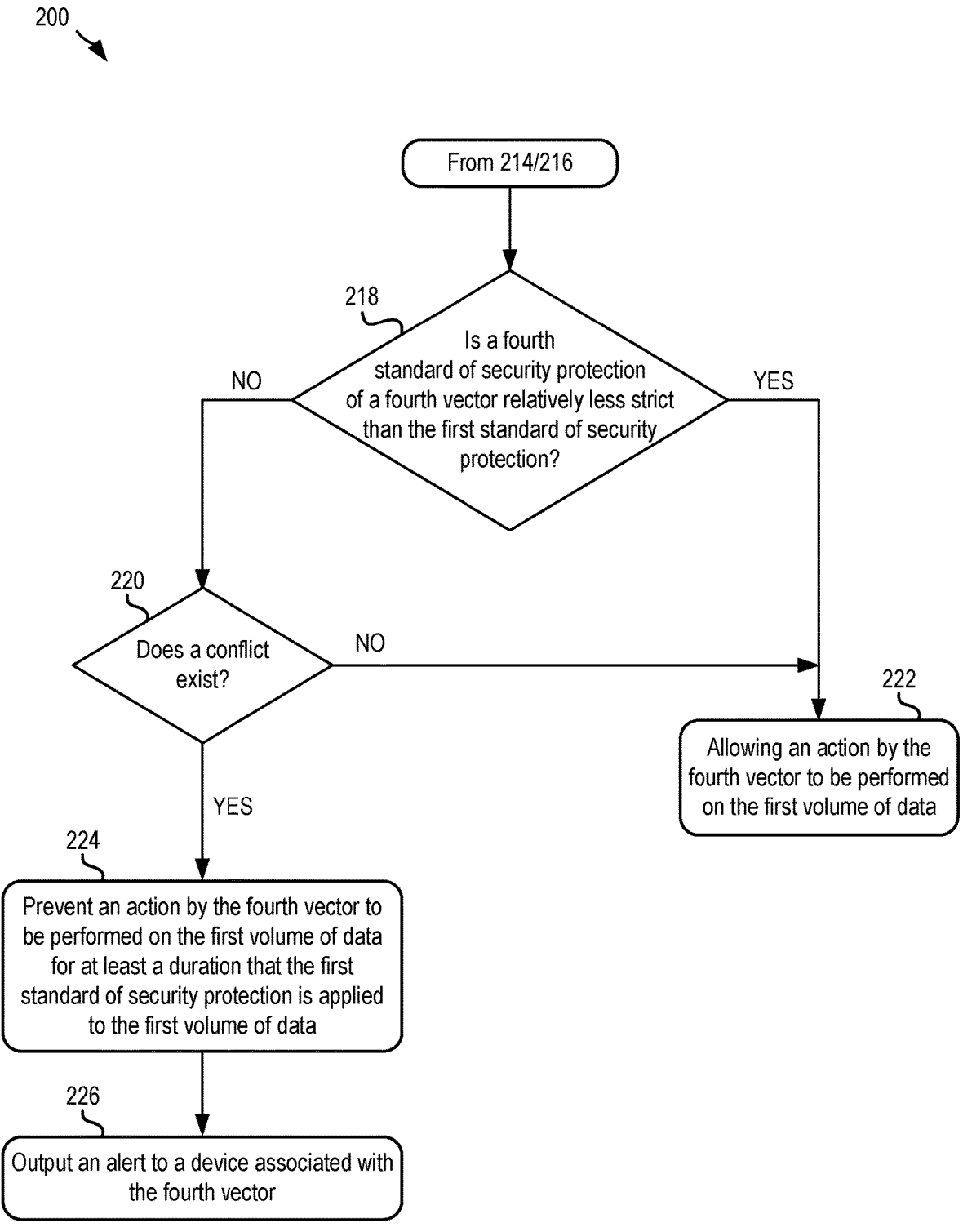

200

From 214/216

218

Is a fourth standard of security protection of a fourth vector relatively less strict than the first standard of security protection?

NO                                                                    YES

220

Does a conflict exist?                          NO

222

Allowing an action by the fourth vector to be performed on the first volume of data

YES

224

Prevent an action by the fourth vector to be performed on the first volume of data for at least a duration that the first standard of security protection is applied to the first volume of data

226

Output an alert to a device associated with the fourth vector

FIG. 2 (continued)

PROTECTION OF DATA BASED ON STANDARDS OF SECURITY PROTECTION

BACKGROUND

The present invention relates to data storage, and more specifically, this invention relates to data storage security.

Data storage environments, such as cloud-based data storage environments, are used to store data by a plurality of users. This data may be stored as data volumes that are accessible for performing data operations, e.g., read operations, write operations, delete operations, etc.

A standard of security protection is a policy that may be implemented in data storage environment in order to ensure some form of security for the volumes of data stored in the data storage environment. Some standards of security protection may, for example, specify rules for accessing the data of the data storage environment, while some other standards of security protection may specify rules for editing the data of the data storage environment.

SUMMARY

A computer-implemented method (CIM), according to one embodiment, includes determining a first standard of security protection of a first vector, and applying the first standard of security protection to a first volume of data. In response to a determination that a second standard of security protection of a second vector is relatively less strict than the first standard of security protection, an action by the second vector is prevented from being performed on the first volume of data for at least a duration that the first standard of security protection is applied to the first volume of data. In response to a determination that a third standard of security protection of a third vector is relatively more strict than the first standard of security protection, an action by the third vector is allowed to be performed on the first volume of data.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

DETAILED DESCRIPTION

Figure 2:
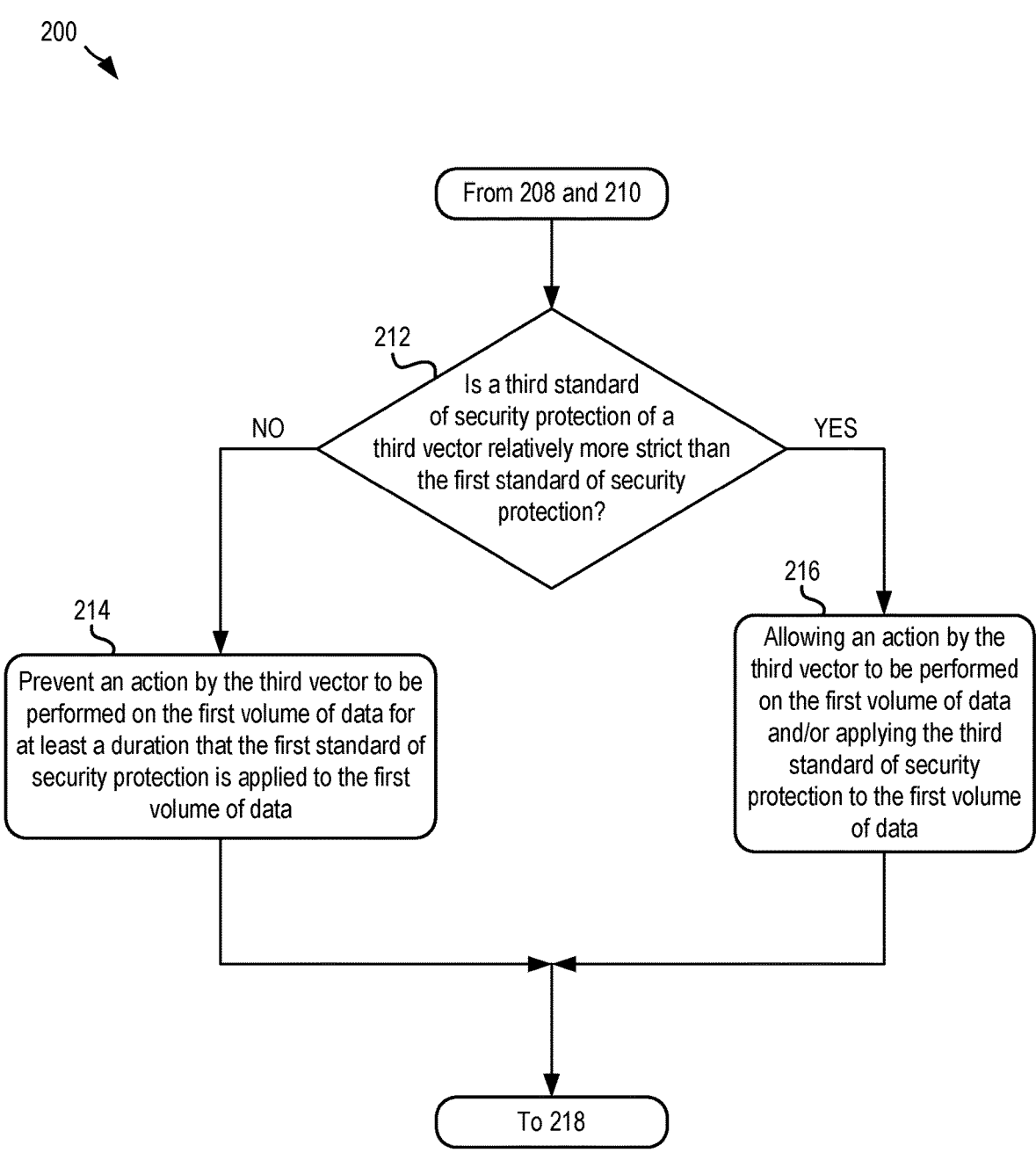
FIG. 2 is a flowchart of a method, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for protection of data based on standards of security protection.

In one general embodiment, a CIM includes determining a first standard of security protection of a first vector, and applying the first standard of security protection to a first volume of data. In response to a determination that a second standard of security protection of a second vector is relatively less strict than the first standard of security protection, an action by the second vector is prevented from being performed on the first volume of data for at least a duration that the first standard of security protection is applied to the first volume of data. In response to a determination that a third standard of security protection of a third vector is relatively more strict than the first standard of security protection, an action by the third vector is allowed to be performed on the first volume of data.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as standard of security protection determination code of block 150 for protection of data based on standards of security protection. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere herein, data storage environments, such as cloud-based data storage environments, are used to store data by a plurality of users. This data may be stored as data volumes that are accessible for performing data operations, e.g., read operations, write operations, delete operations, etc. A standard of security protection is a policy that may be implemented in data storage environment in order to ensure some form of security for the volumes of data stored in the data storage environment. Some standards of security protection may, for example, specify rules for accessing the data of the data storage environment, while some other standards of security protection may specify rules for editing the data of the data storage environment.

Although security authentication measures are implemented in some conventional data storage environments, these measures each of these measures is siloed to just the features and/or functionality contained to each silo. During operation of conventional data storage environments, the deployment of conventional security authentication measures fails to prevent issues in which controllers of operations are unaware and using two different mechanisms that conflict with one another. Furthermore, malicious insiders that do understand such conflicts are able to maliciously cause conflicting data operations to thereby create data losses, e.g., by damaging or deleting a primary copy of data. These issues lead to losses in data of volumes of data as well as the incurrence of latency within data storage environments (based on the need for recovery computational operations in order to attempt to recover from such malicious events).

In order to mitigate the issues described above, the techniques of embodiments and approaches described herein ensure extra protections on data from any vector and/or user by relatively elevating the protection on data managed by a control unit. This way any vector is prevented from affecting the data without having and/or being associated with a currently applied level of authority, e.g., a standard of security protection currently being applied by the control unit on a volume of data. Accordingly, these techniques provide an end-to-end elevated control methodology to enforce administrative protections and thereby reduce a number of computational operations and latency within the data storage environment.

Now referring to FIG. 2, a flowchart of a method 200 is shown according to one embodiment. The method 200 may be performed in accordance with the present invention in any of the environments depicted in FIGS. 1-2, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a controller, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It should be prefaced that, multiple operations of method 200 are described to be performed with respect to one or more vectors. In a relatively broad sense, in some approaches described herein, a vector may be defined as a type of computer device and/or command that may attempt to perform a data operation with respect to a volume of data, e.g., a read operation on at least some of the data of the volume, a write operation on at least some of the data of the volume, a delete operation on at least some of the data of the volume, etc. A vector may, in some approaches, additionally and/or alternatively be defined as a device initiated command that is to be performed with respect to volume(s) of data of a data storage environment. For example, according to a relatively more specific approach, where a flash copy is to be performed on the volume of data, a vector may be defined as a host, e.g., such as a Z-host, initiated command, e.g., where the host initiates the command to a controller that is performing method 200, in an attempt to perform the flash copy. It should further be noted that there may be a plurality of additional peripheral components and/or requests that may contribute to such a command that is to be performed with respect to volume(s) of data of the data storage environment.

The data storage environment may include one or more data storage devices, on which a plurality of volumes of data are stored. In some approaches, the data storage environment includes a cloud storage infrastructure that a plurality of clients store user data on, e.g., uploading and accessing the data using a client device. Client devices may request to perform data operations on the volumes of data, e.g., read operations, write operations, etc., and the requests may be vetted and answered by a control unit (a type of controller that would become apparent to one of ordinary skill in the art after reading the descriptions herein) that is configured to perform method 200.

Furthermore, it may be prefaced that, in some approaches, each of these vectors may adhere to and/or specify a standard of security protection that is to be adhered to during, at least, a period of time that an action of the vector is to be performed on the volume of data. Note however, that this period of time may, in some approaches, extend further than the time in which a data operation is actively being performed on the volume of data. For example, the period of time may include an amount of time that the vector and/or devices associated therewith is authorized to perform a data operation on the volume of data. For context, a standard of security protection may be defined by a protected attribute and/or ruleset that when applied, the data storage environment adheres to, and more specifically, that is enforced with respect to at least one volume of data of the data storage environment. For example, in some approaches, a protected attribute defined within the first standard of security protection includes and/or defines a rule that specifies that the first volume of data mirror a second volume of data, e.g., such as maintaining mirrored copies of a volume of data at all times for failover and/or disaster recovery purposes. A rule of another standard of security protection may additionally and/or alternatively specify that an action performed on the first volume of data be performed with multi-factor authentication. Yet another standard of security protection may additionally and/or alternatively specify that an action performed on the first volume of data be performed with dual control. In some approaches, the dual control may be implemented via interfaces to the control and have security authentication methods such as Dual Control (such as by a Copy Services Manager (CSM) by IBM) and/or a Multi-Factor Authentication (such as via a remote authentication via a graphical user interface (GUI) or command line interface (CLI)).

During performance of method 200, a first vector may be received by a control unit, e.g., a control unit that is performing method 200. In some approaches, the control unit processes a plurality of received vectors, and is configured to control, e.g., allow or deny, which actions associated with vectors are performed on the first volume of data. Operation 202 includes determining, by a control unit, a first standard of security protection of the first vector. As mentioned elsewhere above, a vector may, in some approaches, specify a standard of security protection, and therefore, operation 202 may include extracting the standard of security protection from the first vector, e.g., from an operational request. In some other approaches, the standard of security protection of the first vector may be identified in a table and/or glossary that is maintained and updated based on specifications that are ongoingly provided by components and/or devices associated with the vectors in the data storage environment. Determining the first standard of security protection of the first vector may additionally and/or alternatively include determining at least a predetermined number of rules that data operations of the first vector has adhered to within a predetermined amount of time. These rules may, in some approaches, be aggregated to establish the standard of security protection of the first vector.

Operation 204 includes applying the first standard of security protection to a first volume of data. The first volume of data may, in some approaches, be a volume of data that includes at least some of the data the vector is scheduled to perform a data operation on and/or requests to perform a data operation on. In other words, the first volume of data may be selectively accessed and/or edited during data operations of a plurality of vectors (including the first vector), provided that the control unit authorizes the data operations to be performed. Applying the first standard of security protection to the first volume of data may, in some preferred approaches, include enforcing the first standard of security protection against the first volume of data. In other words, when applied to a volume of data, the standard of security protection is enforced against any vector that attempts and/or requests to perform a data operation against the volume of data. More specifically, in some approaches, the enforcement may be enacted by the control unit (the device performing method 200) analyzing whether other vectors that attempt and/or request to perform a data operation against a volume of data that the standard of security protection is applied to, are authorized to do so (with respect to the currently applied standard of security protection). Various determinations described below detail illustrative examples of this analysis, e.g., see decision 206, decision 212, decision 218, etc.

In some approaches, applying the first standard of security protection to the first volume of data includes determining whether other vectors attempting to perform a data operation on the volume of data adhere to the first standard of security protection. One technique for performing such a determination is illustrated in decision 206, which includes determining whether a second standard of security protection of a second vector is relatively less strict than the first standard of security protection. Note that such a determination may, in some approaches, be performed in response to a determination that the second vector is scheduled to and/or attempts to and/or requests to perform a data operation on the first volume of data.

Techniques for determining whether a second standard of security protection of a second vector is relatively less strict than the first standard of security protection, in some approaches, include determining whether a data operation of the second vector conflicts with the first standard of security protection of the first vector. For example, where a rule of the first standard of security protection specifies that, while the first standard of security protection is being applied to the first volume of data, two mirrored copies of the first volume of data are to be preserved, data operations, such as data delete operations and/or data write operations, being performed on the first volume of data would prevent two mirrored copies of the first volume of data from being preserved. Accordingly, the second standard of security protection of the second vector allowing such a data operation to be performed on the first volume of data (thereby conflicting with the first standard of security protection currently applied to the first volume of data) causes a conflict to exist, which may be used to determine that the second standard of security protection of the second vector is relatively less strict than the first standard of security protection.

In response to a determination that a second standard of security protection of a second vector is relatively less strict than the first standard of security protection, e.g., as illustrated by the "YES" logical path of decision 206, an action by the second vector is prevented from being performed on the first volume of data for at least a duration that the first standard of security protection is applied to the first volume of data, e.g., see operation 208. In some approaches, such an action by the second vector is prevented from being performed by causing, e.g., instructing, scheduling, etc., a device associated with the action to be disabled. In some other approaches, the action by the second vector is prevented from being performed by blocking the action from being performed on the first volume of data. In yet another approach, the action by the second vector is prevented from being performed by barring actions by a device associated with the action from accessing the first volume of data.

In contrast, to the determination above, in some other approaches, in response to a determination that the second standard of security protection of the second vector is relatively equally as strict or more strict than the first standard of security protection, e.g., as illustrated by the "NO" logical path of decision 206, the action by the second vector may optionally be allowed to be performed on the first volume of data within the duration that the first standard of security protection is applied to the first volume of data, e.g., see operation 210. For context, a determination that the second standard of security protection of the second vector is relatively equally as strict or more strict than the first standard of security protection may, in some approaches, be based on a conflict not existing between rules of the second standard of security protection and the first standard of security protection. An illustrative example of a conflict not existing and the second standard of security protection of the second vector being relatively more strict than the first standard of security protection may exist where the first standard of security protection requires that a mirrored copy of the first volume of data is to exist at all times in the data storage environment, and the second standard of security protection requires that no data operations are allowed to be performed on the first volume of data. In other words, the second standard of security protection is relatively stricter than the first standard of security protection by ensuring that the mirrored copy of the first volume of data exists based on no data operations being allowed by the second standard of security protection, and furthermore by not allowing at least some data operations would otherwise be allowed by the first standard of security protection, e.g., such as a read operation that does not disrupt the data mirroring.

It should be noted that conflicts considered herein may preferably be evaluated with respect to the entire duration of time that the first standard of security protection is applied to the first volume of data. This duration may include, e.g., the time before an action of the second vector is performed on the first volume of data, the time during performance of the action of the second vector on the first volume of data, and the time after performance of the action of the second vector on the first volume of data. An illustrative example, of a conflict not existing between rules of the second standard of security protection and the first standard of security protection may be based on the second standard of security protection allowing a read operation to be performed on the first volume of data and/or the action of the second vector being a read operation, while the first standard of security protection specifies that a mirrored copy of the first volume of data is to exist at all times in the data storage environment.

It should be noted that, although the "NO" logical path of decision 206 specifies that the action by the second vector is allowed to be performed on the first volume of data in response to a determination that the second standard of security protection of the second vector is relatively equally as strict or more strict than the first standard of security protection, in some other approaches, additional and/or alternative operations may be performed in response to such a determination. These additional and/or alternative operations are described with respect to other determinations and standards of security protection elsewhere herein, e.g., see "YES" logical path of decision 212 and "NO" logical path of decision 218.

Decision 212 includes determining whether a third standard of security protection of a third vector is relatively more strict than the first standard of security protection. In response to a determination that the third standard of security protection of the third vector is relatively less strict than the first standard of security protection, e.g., as illustrated by the "NO" logical path of decision 212, an action by the third vector is prevented from being performed on the first volume of data for at least the duration that the first standard of security protection is applied to the first volume of data, e.g., see operation 214.

In contrast to the approach above, in response to a determination that a third standard of security protection of a third vector is relatively more strict (or equally as strict in some approaches, such as where the third standard of security protection is the same as the first standard of security protection) than the first standard of security protection, e.g., as illustrated by the "YES" logical path of decision 212, an action by the third vector may be allowed to be performed on the first volume of data during the duration that the first standard of security protection is applied to the first volume of data, e.g., see operation 216. In other words, in some approaches, vectors with at least an equally as strict standard of security protection may be considered a "trusted user" during application of the first standard of security protection on the first volume of data.

A determination may, in some approaches, be made that the third standard of security protection of the third vector is relatively more strict than the first standard of security protection, e.g. see the "YES" logical path of decision 212. In some approaches, in response to the determination that the third standard of security protection of the third vector is relatively more strict than the first standard of security protection, the third standard of security protection is applied to the first volume of data, e.g., see operation 216. Application of the third standard of security protection to the first volume of data, in some approaches, includes stopping the first standard of security protection from being applied to the first volume of data, e.g., the third standard of security protection replaces the first standard of security protection.

A fourth standard of security protection of a fourth vector is considered below in order to describe some approaches in which another standard of security protection of another vector may be determined to be relatively less strict than the first standard of security protection, and yet an action by another vector may still be allowed to occur, e.g., see decision 218.

Decision 218 includes determining whether a fourth standard of security protection of a fourth vector is relatively less strict than the first standard of security protection. Some techniques for determining whether a standard of security protection is relatively less strict than another standard of security protection are described elsewhere herein and may, in some approaches, be relied on for performing decision 218. In response to a determination that the fourth standard of security protection of the fourth vector is relatively more strict than the first standard of security protection, e.g., as illustrated by the "YES" logical path of decision 218, an action by the fourth vector is allowed to be performed on the first volume of data, e.g., see operation 222.

In contrast to the determination above, in some approaches, in response to a determination that the fourth standard of security protection of the fourth vector is relatively less strict than the first standard of security protection, a determination is made as to whether an action by the fourth vector that is to be performed on the first volume of data, conflicts with a protected attribute defined within the first standard of security protection, e.g., see decision 220. For example, in some approaches, the protected attribute defined within the first standard of security protection specifies that the first volume of data mirrors a second volume of data. The action by the fourth vector may be considered a "drastic action," in some approaches, based on the action by the fourth vector being of a predetermined type of action that would prevent fulfillment of the first standard of security protection. For example, the first volume of data may be prevented from mirroring a second volume of data based on the drastic actions being, e.g., a delete operation (such as deleting a volume of data), a data append operation, a data overwrite operation, a remove operation, an overlay replication operation such as FlashCopy by IBM, etc.

In response to a determination that the action by the fourth vector that is to be performed on the first volume of data does not conflict with the protected attribute defined within the first standard of security protection, e.g., as illustrated by the "NO" logical path of decision 220, method 200 optionally continues to operation 222. In other words, in response to a determination that the action by the fourth vector does not conflict with the protected attribute defined within the first standard of security protection, the action by the fourth vector is allowed to be performed on the first volume of data during the duration that the first standard of security protection is applied to the first volume of data. In contrast, in response to a determination that the action by the fourth vector conflicts with the protected attribute defined within the first standard of security protection, e.g., as illustrated by the "YES" logical path of decision 220, the action by the fourth vector is prevented from being performed on the first volume of data for at least a duration that the first standard of security protection is applied to the first volume of data, e.g., see operation 224.

Feedback may optionally be provided to warn users and/or devices associated with vectors that are determined to conflict with a protected attribute and/or standard of security protection currently being applied to the first volume of data. For example, in some approaches, in response to the determination that the action by the fourth vector conflicts with the protected attribute defined within the first standard of security protection, method 200 includes outputting an alert to a device associated with the fourth vector, e.g., see operation 226. The alert, in some approaches, preferably indicates that the action by the fourth vector is a drastic action that would compromise an integrity of the first volume of data with respect to the protected attribute defined within the first standard of security protection. This way, the device associated with the fourth vector thereafter may prevent such vectors from being processed for the duration that the first standard of security protection is applied to the first volume of data, thereby preserving computational resources of a component performing method 200 (where such computational resources would otherwise be expended without such an alert being output.

A list of protected attribute(s) of different standards of security protection may be maintained, in some approaches. The list may include any number of protected attributes that are defined within standards of security protection, e.g., such as protected attribute(s) defined within the first standard of security protection, protected attribute(s) defined within the second standard of security protection, etc. The list may be used, e.g., accessed and used by a trained artificial intelligence (AI) model configured to compare entries of the list, for determining whether a given second standard of security protection of a given vector is relatively less strict than another standard of security protection, e.g., for example whether the second standard of security protection of the second vector is relatively less strict than the first standard of security protection. In another example, the list may be used for determining whether the third standard of security protection of the third vector is relatively less strict than the first standard of security protection.

Method 200, in some approaches, includes ongoingly updating an interface that details which standard of security protection is currently being applied to a given volume of data, e.g., the first volume of data. Furthermore, devices associated with the vectors may optionally be provided viewing access of the interface, where the interface details which vector(s) have a standard of security protection currently being applied to the first volume of data. This enables a reduction in network traffic in the data storage environment, because vectors having relatively less strict standards of security protection and/or having actions conflicting with a currently applied standards of security protection may not be sent to a control unit performing method 200 based on a realization that associated vectors will not be allowed to perform the actions on the first volume of data. In some approaches, information of the interface may be checked in order to perform a determination of whether an initiator vector of a drastic action has, in effect, an acceptable standard of security protection in order to take the action.

In some illustrative approaches, method 200 may include determining that a first set of vectors have a relatively higher standard of security protection (such as dual control requirements, a multi-factor authentication rule, protections from multiple trusted users, etc., the control unit performing method 200 may require additional protections from the other vectors before taking a drastic action from a vector with a lessor security. For example, in some approaches, in response to a determination that a vector has a relatively less strict standard of security protection than a first standard of security protection currently applied to a first volume of data, a notification may be output to a user deice associated with the vector, where the notification indicates a standard of security protection that the vector must adhere to in order to be approved to perform an action on the first volume of data.

In some other illustrative approaches in which a CSM is used in the data storage environment, in response to a determination that an applied standard of security protection requires a protected FlashCopy relationship to be maintained, the control unit does not allow a volume of data to be deleted that would compromise the existing FlashCopy relationship. Similarly, in some other approaches in which a non-CSM initiated host command action would otherwise cause a Release Space to occur and/or an existing FlashCopy relationship occurs, the action is not allowed to be taken. More specifically, not only would the action be failed back to the originator, but furthermore, in some approaches, a "call home" may be triggered that is configured to cause a predetermined support resource to intervene and advise a customer associated with the vector of the mismatch in vectors. This intervening may be needed to protect a volume of data (or box), or in order to warn a customer of the existence of a replication relationship and the vector's attempt at taking a 'drastic' action against the protected data or relationship.

A host with relatively strict multi-factor authentication (MFA) requirements, e.g., such as a host using Resource Access Control Facility (RACF) by IBM for instance, may additionally be the vector with the relatively highest standard of security protection as well and be used to protect the data the accesses or puts into a replication relationship.

It should be noted that, although various approaches and embodiments herein are described with respect to a first volume of data, in some approaches, method 200 may additionally and/or alternatively be performed with respect to a plurality of volumes of data, e.g., analyzing vectors simultaneously with respect to actions that are to be performed on different volumes of data. Furthermore, it should be noted that standards of security protection described herein may be considered and/or based on one or more predetermined granularities, e.g., control unit wide, volume wide, relationship wide, etc.

The techniques of embodiments and approaches described herein provide end-to-end protection for data retention rather than requiring a customer to follow best practices. This protection allows for auditability of an actual method to enforce immutability. Specifically, in some approaches, only a vector with the relatively highest level of support is allowed to take 'drastic' actions, while other vectors cannot take such actions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:
   determining a first standard of security protection of a first vector;
   applying the first standard of security protection to a first volume of data,
   wherein the applying the first standard of security protection comprises enforcing the first standard of security protection against a plurality of vectors that attempt to perform data operation(s) against the first volume of data;
   in response to a determination that a second standard of security protection of a second vector is less strict than the first standard of security protection, preventing an action by the second vector to be performed on the first volume of data for at least a duration that the first standard of security protection is applied to the first volume of data; and
   in response to a determination that a third standard of security protection of a third vector is more strict than the first standard of security protection, allowing an action by the third vector to be performed on the first volume of data.

2. The CIM of claim 1, comprising: in response to the determination that the third standard of security protection of the third vector is more strict than the first standard of security protection, applying the third standard of security protection to the first volume of data, wherein the plurality of vectors includes the second vector and the third vector.

3. The CIM of claim 1, comprising: in response to a determination that a fourth standard of security protection of a fourth vector is less strict than the first standard of security protection, determining whether an action by the fourth vector that is to be performed on the first volume of data conflicts with a protected attribute defined within the first standard of security protection; in response to a determination that the action by the fourth vector conflicts with the protected attribute defined within the first standard of security protection, preventing the action by the fourth vector from being performed on the first volume of data for at least the duration that the first standard of security protection is applied to the first volume of data; and in response to a determination that the action by the fourth vector does not conflict with the protected attribute defined within the first standard of security protection, allowing the action by the fourth vector to be performed on the first volume of data.

4. The CIM of claim 3, comprising: in response to the determination that the action by the fourth vector conflicts with the protected attribute defined within the first standard of security protection, outputting an alert to a device associated with the fourth vector, wherein the alert indicates that the action by the fourth vector is a drastic action that would compromise an integrity of the first volume of data with respect to the protected attribute defined within the first standard of security protection.

5. The CIM of claim 4, wherein the protected attribute defined within the first standard of security protection specifies that the first volume of data mirror a second volume of data, wherein the action by the fourth vector is the drastic action based on the action by the fourth vector being selected from the group consisting of: a delete operation, a data append operation, and a data overwrite operation.

6. The CIM of claim 1, wherein a protected attribute defined within the first standard of security protection is selected from the group consisting of:

a rule that specifies that the first volume of data mirror a second volume of data, a rule that specifies that an action performed on the first volume of data be performed with multi-factor authentication, and a rule that specifies that an action performed on the first volume of data be performed with dual control.

7. The CIM of claim 6, comprising: maintaining a list of protected attribute(s) of different standards of security protection, wherein the list includes the protected attribute defined within the first standard of security protection; using the list for determining whether the second standard of security protection of the second vector is less strict than the first standard of security protection; and using the list for determining whether the third standard of security protection of the third vector is less strict than the first standard of security protection.

8. The CIM of claim 7, comprising: updating an interface that details which standard of security protection is currently being applied to the first volume of data; and providing, devices associated with the vectors, viewing access of the interface.

9. A computer program product (CPP), the CPP comprising:

a set of one or more computer-readable storage media; and program instructions, collectively stored in the set of one or more storage media, for causing a processor set to perform the following computer operations:

determine a first standard of security protection of a first vector;

apply the first standard of security protection to a first volume of data, wherein the applying the first standard of security protection comprises enforcing the first standard of security protection against a plurality of vectors that attempt to perform data operation(s) against the first volume of data;

in response to a determination that a second standard of security protection of a second vector is less strict than the first standard of security protection, prevent an action by the second vector to be performed on the first volume of data for at least a duration that the first standard of security protection is applied to the first volume of data; and in response to a determination that a third standard of security protection of a third vector is more strict than the first standard of security protection, allow an action by the third vector to be performed on the first volume of data.

10. The CPP of claim 9, the CPP comprising:

program instructions, collectively stored in the set of one or more storage media, for causing the processor set to perform the following computer operations: in response to the determination that the third standard of security protection of the third vector is more strict than the first standard of security protection, apply the third standard of security protection to the first volume of data, wherein the plurality of vectors includes the second vector and the third vector.

11. The CPP of claim 9, the CPP comprising:

program instructions, collectively stored in the set of one or more storage media, for causing the processor set to perform the following computer operations: in response to a determination that a fourth standard of security protection of a fourth vector is less strict than the first standard of security protection, determine whether an action by the fourth vector that is to be performed on the first volume of data conflicts with a protected attribute defined within the first standard of security protection; in response to a determination that the action by the fourth vector conflicts with the protected attribute defined within the first standard of security protection, prevent the action by the fourth vector from being performed on the first volume of data for at least the duration that the first standard of security protection is applied to the first volume of data; and in response to a determination that the action by the fourth vector does not conflict with the protected attribute defined within the first standard of security protection, allow the action by the fourth vector to be performed on the first volume of data.

12. The CPP of claim 11, the CPP comprising: program instructions, collectively stored in the set of one or more storage media, for causing the processor set to perform the following computer operations: in response to the determination that the action by the fourth vector conflicts with the protected attribute defined within the first standard of security protection, output an alert to a device associated with the fourth vector, wherein the alert indicates that the action by the fourth vector is a drastic action that would compromise an integrity of the first volume of data with respect to the protected attribute defined within the first standard of security protection.

13. The CPP of claim 12, wherein the protected attribute defined within the first standard of security protection specifies that the first volume of data mirror a second volume of data, wherein the action by the fourth vector is the drastic action based on the action by the fourth vector being selected from the group consisting of: a delete operation, a data append operation, and a data overwrite operation.

14. The CPP of claim 9, wherein a protected attribute defined within the first standard of security protection is selected from the group consisting of:

a rule that specifies that the first volume of data mirror a second volume of data, a rule that specifies that an action performed on the first volume of data be performed with multi-factor authentication, and a rule that specifies that an action performed on the first volume of data be performed with dual control.

15. The CPP of claim 14, the CPP comprising:

program instructions, collectively stored in the set of one or more storage media, for causing the processor set to perform the following computer operations:

maintain a list of protected attribute(s) of different standards of security protection, wherein the list includes the protected attribute defined within the first standard of security protection; use the list for determining whether the second standard of security protection of the second vector is less strict than the first standard of security protection; and use the list for determining whether the third standard of security protection of the third vector is less strict than the first standard of security protection.

16. The CPP of claim 15, the CPP comprising: program instructions, collectively stored in the set of one or more storage media, for causing the processor set to perform the following computer operations: update an interface that details which standard of security protection is currently being applied to the first volume of data; and provide, devices associated with the vectors, viewing access of the interface.

17. A computer system (CS), the CS comprising:
a processor set;
a set of one or more computer-readable storage media; and
program instructions, collectively stored in the set of one or more storage media, for causing the processor set to perform the following computer operations:
determine a first standard of security protection of a first vector;
apply the first standard of security protection to a first volume of data,
wherein the applying the first standard of security protection comprises enforcing the first standard of security protection against a plurality of vectors that attempt to perform data operation(s) against the first volume of data;
in response to a determination that a second standard of security protection of a second vector is less strict than the first standard of security protection, prevent an action by the second vector to be performed on the first volume of data for at least a duration that the first standard of security protection is applied to the first volume of data; and
in response to a determination that a third standard of security protection of a third vector is more strict than the first standard of security protection, allow an action by the third vector to be performed on the first volume of data.

18. The CS of claim 17, the CS comprising: program instructions, collectively stored in the set of one or more storage media, for causing the processor set to perform the following computer operations: in response to the determination that the third standard of security protection of the third vector is more strict than the first standard of security protection, apply the third standard of security protection to the first volume of data, wherein the plurality of vectors includes the second vector and the third vector.

19. The CS of claim 17, the CS comprising: program instructions, collectively stored in the set of one or more storage media, for causing the processor set to perform the following computer operations: in response to a determination that a fourth standard of security protection of a fourth vector is less strict than the first standard of security protection, determine whether an action by the fourth vector that is to be performed on the first volume of data conflicts with a protected attribute defined within the first standard of security protection; in response to a determination that the action by the fourth vector conflicts with the protected attribute defined within the first standard of security protection, prevent the action by the fourth vector from being performed on the first volume of data for at least the duration that the first standard of security protection is applied to the first volume of data; and in response to a determination that the action by the fourth vector does not conflict with the protected attribute defined within the first standard of security protection, allow the action by the fourth vector to be performed on the first volume of data.

20. The CS of claim 17, wherein a protected attribute defined within the first standard of security protection is selected from the group consisting of: a rule that specifies that the first volume of data mirror a second volume of data, a rule that specifies that an action performed on the first volume of data be performed with multi-factor authentication, and a rule that specifies that an action performed on the first volume of data be performed with dual control.

* * * * *